US011818087B1

(12) United States Patent
Palki et al.

(10) Patent No.: US 11,818,087 B1
(45) Date of Patent: Nov. 14, 2023

(54) USER-TO-USER MESSAGING-BASED SOFTWARE TROUBLESHOOTING TOOL

(71) Applicant: Splunk Inc., San Francisco, CA (US)

(72) Inventors: Manoj Bapuji Palki, Santa Clara, CA (US); Kapil Rastogi, Santa Clara, CA (US)

(73) Assignee: SPLUNK INC., San Francisco, CA (US)

( * ) Notice: Subject to any disclaimer, the term of this patent is extended or adjusted under 35 U.S.C. 154(b) by 0 days.

(21) Appl. No.: 17/700,221

(22) Filed: Mar. 21, 2022

(51) Int. Cl.
*G06F 15/16* (2006.01)
*H04L 51/18* (2022.01)
*G06F 9/455* (2018.01)
*H04L 51/046* (2022.01)
*G06F 9/54* (2006.01)
*H04L 67/10* (2022.01)

(52) U.S. Cl.
CPC .......... *H04L 51/18* (2013.01); *G06F 9/45512* (2013.01); *G06F 9/547* (2013.01); *H04L 51/046* (2013.01); *H04L 67/10* (2013.01)

(58) Field of Classification Search
None
See application file for complete search history.

(56) References Cited

U.S. PATENT DOCUMENTS

| 5,751,962 | A * | 5/1998 | Fanshier | H04L 41/0233 709/224 |
| 6,754,707 | B2 * | 6/2004 | Richards | H04L 9/40 709/227 |
| 7,937,344 | B2 | 5/2011 | Baum et al. | |
| 8,112,425 | B2 | 2/2012 | Baum et al. | |
| 8,751,529 | B2 | 6/2014 | Zhang et al. | |
| 8,788,525 | B2 | 7/2014 | Neels et al. | |
| 9,215,240 | B2 | 12/2015 | Merza et al. | |
| 9,286,413 | B1 | 3/2016 | Coates et al. | |
| 10,127,258 | B2 | 11/2018 | Lamas et al. | |
| 10,270,644 | B1 * | 4/2019 | Valsecchi | H04L 41/0681 |
| 10,489,232 | B1 * | 11/2019 | BeSerra | G06F 11/0709 |
| 10,728,781 | B2 * | 7/2020 | Timmons | H04W 24/08 |

(Continued)

OTHER PUBLICATIONS

Splunk Enterprise 8.0.0 Overview, available online, retrieved May 20, 2020 from docs.splunk.com.

(Continued)

*Primary Examiner* — Yves Dalencourt
(74) *Attorney, Agent, or Firm* — Perkins Coie LLP

(57) ABSTRACT

A method comprises executing a user-to-user messaging application in a first computer system used by a user support agent. The user-to-user messaging application receives an input from the user support agent, where the input includes a command for triggering a test of a human-invocable operation of a service that operates on a first cloud-based computing platform. The user-to-user messaging application transmits the command from the first computer system to a web service hosted on a second cloud-based computing platform via a computer network, to invoke an API of the web service. The second cloud-based computing platform is remote from the first computer system. Invocation of the API by the web service initiates the test of the human-invocable operation of the cloud-based service that operates on the first cloud-based computing platform.

20 Claims, 5 Drawing Sheets

(56) References Cited

U.S. PATENT DOCUMENTS

| | | | | |
|---|---|---|---|---|
| 10,789,354 | B1* | 9/2020 | Pham | G06F 21/561 |
| 10,866,849 | B2* | 12/2020 | Das | G06F 11/0793 |
| 11,334,420 | B2* | 5/2022 | Valdes Esquivel | G06F 40/279 |
| 2009/0135731 | A1* | 5/2009 | Secades | H04W 68/12 |
| | | | | 370/252 |
| 2013/0030639 | A1* | 1/2013 | Gasperson | G06F 11/0748 |
| | | | | 705/7.14 |
| 2016/0350132 | A1* | 12/2016 | Seibert | G06F 11/2294 |
| 2018/0121808 | A1* | 5/2018 | Ramakrishna | G06F 11/0709 |
| 2019/0098106 | A1 | 3/2019 | Mungel et al. | |
| 2021/0233294 | A1* | 7/2021 | Nunez | G06T 11/206 |
| 2021/0397438 | A1* | 12/2021 | Sirov | H04L 12/2834 |

OTHER PUBLICATIONS

Splunk Cloud 8.0.2004 User Manual, available online, retrieved May 20, 2020 from docs.splunk.com.
Splunk Quick Reference Guide, updated 2019, available online at https://www.splunk.com/pdfs/solution-guides/splunk-quick-reference-guide.pdf, retrieved May 20, 2020.
Carasso, David, "Exploring Splunk," published by CITO Research, New York, NY, Apr. 2012.
Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

* cited by examiner

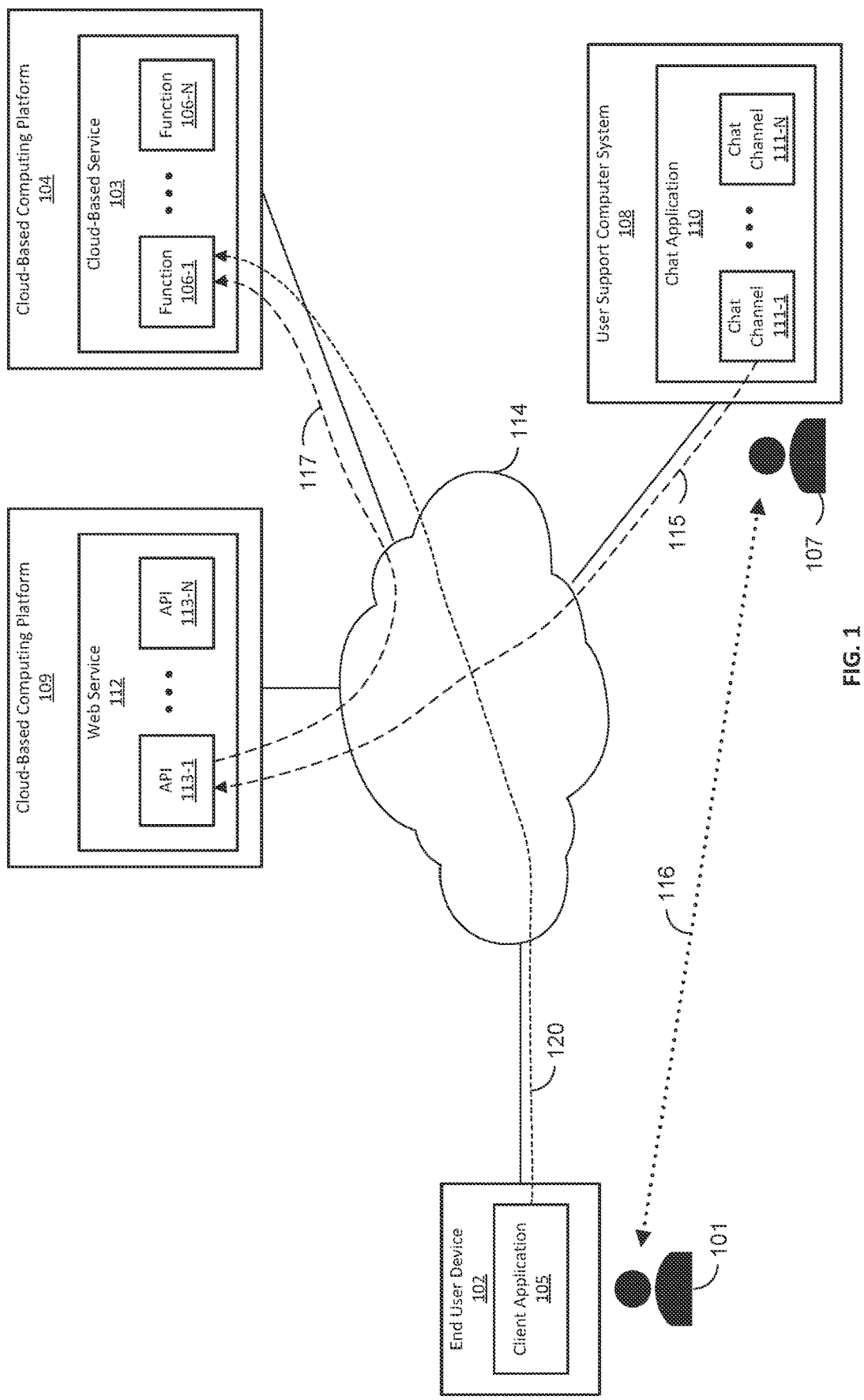

200

Execute a user-to-user messaging application in a first computer system used by a user support agent
202

Receive, by the user-to-user messaging application, an input from the user support agent, the input including a command for initiating a test of a human-invocable operation of a service that operates on a first cloud-based computing platform
204

Transmit, by the user-to-user messaging application, an application programming interface (API) call from the first computer system to a web service hosted on a second cloud-based computing platform via a computer network in response to the command, to invoke an API of the web service, wherein the second cloud-based computing platform is remote from the first computer system, and wherein invocation of the API by the web service hosted on the second cloud-based computing platform initiates the test of the human-invocable operation of the cloud-based service that operates on the first cloud-based computing platform
206

FIG. 2

USER-TO-USER MESSAGING-BASED SOFTWARE TROUBLESHOOTING TOOL

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center: a centralized location where computing resources are kept and maintained, and whose resources are accessible over a network. In this example, users associated with the entity that operates the data center can access the computing resources in the data center over public and/or private networks that may not be operated and controlled by the same entity. Alternatively or additionally, the operator of the data center may provide the computing resources to users associated with other entities, for example on a subscription basis. In both of these examples, users may expect resources to be available on demand and without direct active management by the user, a resource delivery model often referred to as cloud computing.

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center: a centralized location where computing resources are kept and maintained, and whose resources are accessible over a network. In this example, users associated with the entity that operates the data center can access the computing resources in the data center over public and/or private networks that may not be operated and controlled by the same entity. Alternatively or additionally, the operator of the data center may provide the computing resources to users associated with other entities, for example on a subscription basis. In both of these examples, users may expect resources to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and information about the computing environment can aid the entity in understanding whether the computing environment is serving its purpose well.

Certain entities such as those mentioned above may provide software-as-a-service (SaaS) resources for clients or customers. SaaS is a software licensing and delivery method in which software is licensed by subscription and is centrally hosted. SaaS along with web-based software services ("web services") is considered to be an aspect of cloud-based computing ("cloud computing").

BRIEF DESCRIPTION OF THE DRAWINGS

Illustrative examples are described in detail below with reference to the following figures:

FIG. 1 is a block diagram showing an example implementation of a system that facilitates user support based troubleshooting in a computer system.

FIG. 2 is a flowchart illustrating an example process for facilitating user support troubleshooting.

DETAILED DESCRIPTION

Figure 3:
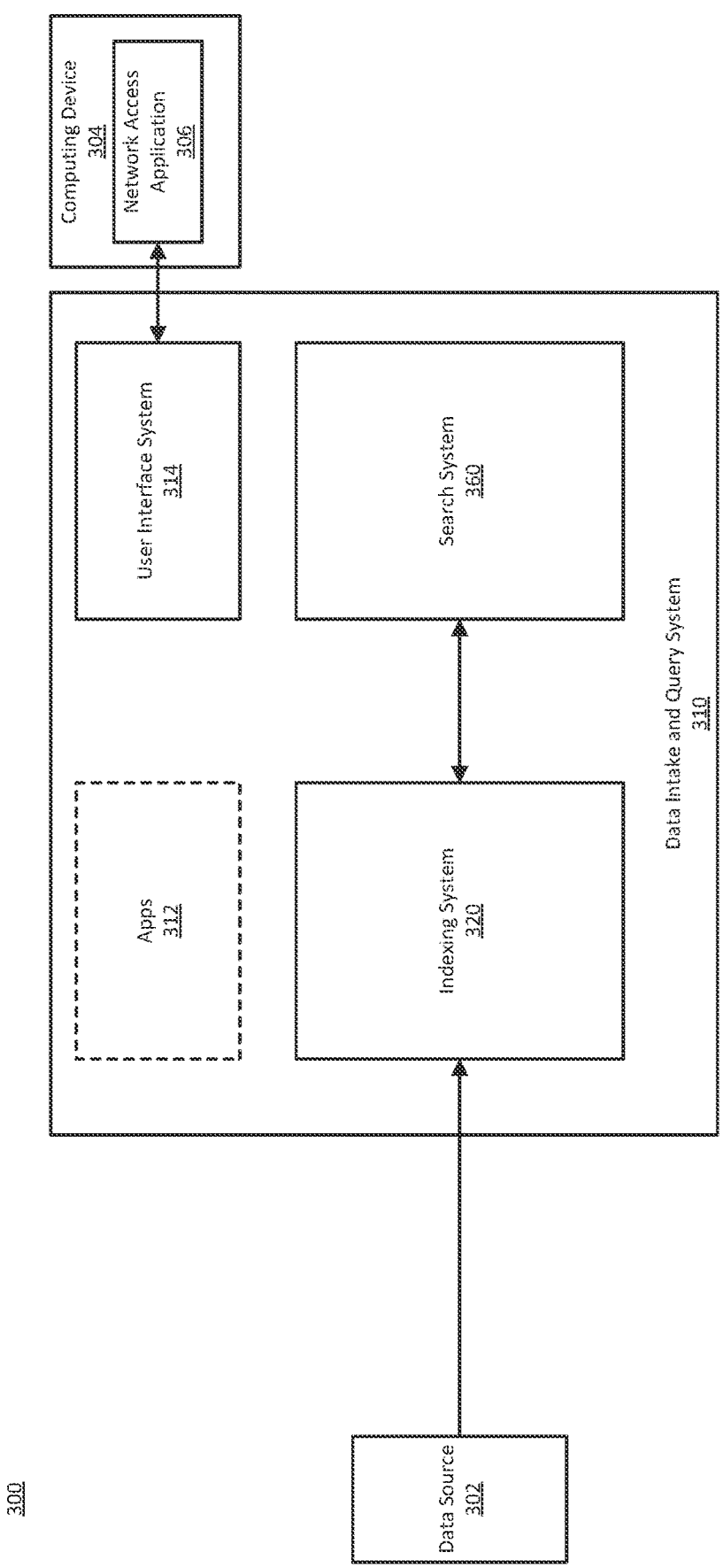
FIG. 3 is a block diagram illustrating an example computing environment that includes a data intake and query system.

Customer support staff at network operations centers (NOCs) are usually the first point of contact at SaaS companies for customers having technical issues. Since the issues can span a range of applications and features, it is typically not practical for an NOC engineer (i.e., the user support agent) to be trained to troubleshoot issues in depth. Instead, the expectation is usually that the NOC engineer will quickly gauge the severity of the complaint and prioritize it accordingly, before escalating the issue to an application engineer. The NOC engineer usually has access to a quick runbook to help assess the severity of the issue, but generally lacks the depth of knowledge that an application engineer has. On the other hand, because of their generally deep knowledge of the product, an application engineer is sometimes asked to troubleshoot issues in production software code, but lacks the credentials to login to production systems. This division of responsibilities between the NOC engineer and the application engineer tends to create inefficiency and delay in resolving customers' technical issues.

Accordingly, the solution introduced here (hereinafter "the solution") addresses the above-mentioned problems. In particular, the solution provides a more efficient technique for enabling user support staff to address customers' (end users') technical issues related to software, particularly but not exclusively software in a cloud computing (e.g., SaaS) environment. It does so by enabling a user support agent (e.g., a NOC engineer) to input a command into a simple user-to-user messaging interface, such as a chat interface, to trigger directly any of one or more pre-identified (i.e., identified before run-time) functions of a cloud-based software system, for the purpose of testing those functions in a production environment. The pre-identified functions are generally those functions of a software system that are expected to be the subject of the most frequent user support requests, but can be any functions of the subject software system. The solution enables a user support agent to associate parameters with the input commands to cause the functions to be performed automatically as if the complaining end user (or any particular user) had triggered them. This approach enables the user support agent to ascertain whether the technical issue is specific to the complaining end user or, conversely, is wider in scope. By invoking the functions using various different parameter sets, the support agent can ascertain the scope of the problem.

In at least some instances, the solution includes, firstly, executing a user-to-user messaging application in a computer system used by a user support agent (e.g., an NOC engineer). The user-to-user messaging application can be, for example, an Internet relay chat (IRC) communication application, such as Slack, available from Slack Technologies, of San Francisco, Calif. The user-to-user messaging application receives an input from the user support agent, where the input includes a command and, in some instances, one or more parameters, for triggering a test of a human-invocable operation of a cloud-based software-implemented service that operates on a first cloud-based computing platform. One example of the cloud-based software-implemented service ("cloud-based service") is a data intake and query system, such as an instance of Splunk Enterprise, available from Splunk Inc., of San Francisco, Calif. The human-invocable operation may be, for example, any operation that can be invoked by a human being, such as a user login operation, execution of a user-specified search query, creating a user group, changing a user password, changing a user access permission, etc. The user support agent may input the command (and if applicable, parameters) into the user-to-user messaging application in response to a complaint or request from a customer about a technical issue the customer is experiencing with some function of a first cloud-based computing platform (e.g., logging in or executing a search query).

The command and parameters input by the user support agent are, in effect, an application programming interface (API) call. This API call is transmitted from the user support agent's computer system, by the user-to-user messaging application via a dedicated messaging channel, to a web service hosted on a second cloud-based computing platform via a computer network, to invoke an API of the web service. The second cloud-based computing platform can be, for example, Amazon Web Services (AWS), in which case the above-mentioned web service can be, for example, an instance of AWS Lamda. The API in the web service is designed to respond to the API call by invoking the human-invocable operation of the cloud-based service that operates on the first cloud-based computing platform.

The solution introduced here will now be further described with respect to the accompanying figures. FIG. 1 shows an example implementation of the solution and its operation. An end user 101 using an end user device 102 desires to access a cloud-based service 103 provided by a first cloud-based computing platform 104. The end user device 102 may be, for example, a conventional desktop, laptop, notebook or tablet computer or smartphone, for example. The end user device 102 includes a client software application 105 for accessing the cloud-based service 103. The client software application 105 may be, for example, a conventional web browser or a dedicated application specifically designed for accessing the cloud-based service 103.

The cloud-based service 103 includes one or more identified operations or functions 106-1 through 106-N (collectively referred to as "functions 106"), which are a subset of all the functions and operations that the cloud-based service 103 can perform (in this description the terms "function" and "operation" are used interchangeably). The functions 106 may include, for example, a login function to authenticate users and control access to the other functions/operations of the cloud-based service. In one example, the cloud-based service 103 is a data intake and query system that facilitates search and analysis by a user of large volumes of data (i.e., "big data"). An example of such a system is described further below in connection with FIGS. 3 through 5. Further, an example of such a system is Splunk Enterprise, available from Splunk Inc., of San Francisco, Calif. In a case where the cloud-based service 103 is a data intake and query system, the functions 106 within the cloud-based service 103 may include, for example, a search function that allows the user to specify a search query, for searching stored data.

While using or attempting to access the cloud-based service 103, the end-user 101 may encounter one or more technical issues. Accordingly, the end-user 101 may contact a user support agent 107 who uses a user support computer system 108. The user support computer system 108 may be, for example, a conventional desktop, laptop, notebook or tablet computer or smartphone, for example. In the examples discussed herein, the user support agent 107 is generally assumed to be a human being. In other examples, however, the user support agent 107 may be automated and/or implemented as a software program that executes on the user support computer system 108.

In at least some instances, the solution introduced here can be implemented at least partially within the user support computer system 108. Other aspects of the solution may be implemented within a second cloud-based computing platform 109. As mentioned above, the solution introduced here enables more efficient troubleshooting of technical issues by user support staff of a SaaS organization or other cloud computing entity.

In the illustrated embodiment, the user support computer system 108 includes a chat application 110, which includes or implements one or more (N) dedicated chat channels 111-1 through 111-N (collectively "chat channels 111"). In some embodiments, as further described below, each dedicated chat channel 111 is dedicated for use in connection with triggering a specific one of the identified functions 106 of the cloud-based service 103 for troubleshooting purposes. In other embodiments, a single chat channel 111 may be used to support multiple different functions/commands. In at least some embodiments, the chat application 110 is an IRC based chat application, such as Slack. In other embodiments, a different type of user-to-user messaging application, such as email, may be substituted for chat application 110.

The second cloud-based computing platform 109 includes a web service 112 that implements one or more APIs 113-1 through 113-N (collectively "APIs 113"), each of which is associated with a corresponding one of the dedicated chat channels 111 and a corresponding one of the functions 106 of the cloud-based service 103. Each of the dedicated chat channels 111 is configured to send an API call to the corresponding API 113 in the web service 112, when invoked by an appropriate command that is input by the user support agent 107. Each of the APIs 113 contains software code for triggering a particular one of the functions 106 of the cloud-based service 103, and for returning the results of that function to the chat application 110 via the same chat channel 111 from which that API was called, for display to the user support agent 107.

To better understand how the solution can operate, consider the following example in reference to FIG. 1. An end user 101 named Jane Smith has attempted unsuccessfully via the Internet 114 to login 120 to her account on the cloud-based service 103, which in this example is a data intake and query system. Therefore, Jane Smith contacts user support agent 107. She may do so using any conventional method 116 of user-to-user communication, such as telephone, email or a chat application (which can be, but is not necessarily, chat application 110). After receiving Jane's description of the problem, the user support agent 107 opens or activates on his computer a dedicated chat channel 111 of chat application 110, i.e., a chat channel that is dedicated for use in troubleshooting login operations. He then enters a simple command and parameters into the user interface of that dedicated chat channel 111. The chat application 110 may be, for example, Slack, in which case the dedicated chat channel 111 is a dedicated Slack channel.

The command and parameters together may be, for example, a generic (i.e., user-agnostic) login command, which enables the user support agent 107 to ascertain whether the login function is not working only for that specific user or if the problem is more widespread (if the generic login command works, this indicates that the problem is likely specific to that user). For example, the login command could have the format, "/login company-name cloud-environment," and a specific example of such a login command with this format for a company called Acme might be "/login acme us-east-1." Note, however, that the specific syntax of this command and parameters is not germane; any permissible or convenient syntax can be used. The command and (if present) parameters are, in effect, an API call 115 for a corresponding one of the APIs 113 in the web service 112. When the user support agent 107 types the command and (if appropriate) parameters into the chat interface and hits "enter," the chat application 110 sends the API call 115 (command and parameters) via the Internet 114 to (in this example) the web service 112, which can be, for example, an AWS Lamda instance running on AWS. The web service 112 contains a dedicated API 113 specifically designed to trigger a login operation (a function 106) on the data intake and query system (cloud-based service 103) with the provided parameters. The web service 112 identifies the appropriate API 113 for triggering the login function, based on the command and parameters received via the chat channel 111. The API 113 may be implemented in any permissible or convenient language, such as Python, C #or Java.

The API 113, upon being invoked by the web service 112 in response to the received command, retrieves the user credentials (e.g., username and password) of Jane Smith and attempts to login 117 to the data intake and query system using Jane Smith's credentials, by invoking the appropriate function 111 of the cloud-based service 103. The API 113 then returns the result (e.g., "login success" or "login failure") via the dedicated chat channel to the user support computer system 108, where the result is displayed to the user support agent 107. In this example of a login operation, the result may be "login failure," which may indicate that the login issue is not limited to Jane Smith. On the other hand, the result may be "login success," which may indicate that the login issue is limited to Jane Smith.

FIG. 2 is a flowchart illustrating an example process 200 for facilitating user support troubleshooting on a software system, such as the cloud-based service in FIG. 1. The example process 200 can be implemented, for example, by a computing device that comprises a processor and a non-transitory computer-readable medium. The non-transitory computer readable medium can be storing instructions that, when executed by the processor, can cause the processor to perform the operations of the illustrated process 200. Alternatively or additionally, the process 200 can be implemented using a non-transitory computer-readable medium storing instructions that, when executed by one or more processors, case the one or more processors to perform the operations of the process 200 of FIG. 2.

The process 200 begins with (step 202) executing a user-to-user messaging application in a first computer system used by a user support agent. The process then continues with (step 204) receiving, by the user-to-user messaging application, an input from the user support agent, the input including a command for triggering a test of a human-invocable operation of a service that operates on a first cloud-based computing platform. The service can be part of a data intake and query system. The input may be received in a dedicated chat channel, where the dedicated chat channel may be dedicated for use in triggering test operations on the cloud-based service. The test operations may be human invocable operations, such as a login operation or a search query. The user-to-user messaging application may be an IRC based chat-based application, such as Slack. Hence, receiving the input from the user support agent can comprise receiving the input in a dedicated Slack channel, wherein the dedicated Slack channel is dedicated for performing the test operation. The command received by the user-to-user messaging application can specify one or more parameters to be used in executing the human-invocable operation of the cloud-based service. The one or more parameters can comprise, for example, at least one of a user credential or a search query criterion.

Additionally, the web service hosted on the second cloud-based computing platform can be an event-driven, serverless, cloud-based computing service. In this context, "serverless" means that the cloud-based service that hosts the web service manages the computing resources required by the web service, such that the developer of the web service code does not need to be concerned with provisioning or management of servers. For example, the web service can be a part of Amazon Web Services (AWS), in which case the web service can be or include an instance of AWS Lambda.

Next, the process concludes with (step 206) transmitting by the user-to-user messaging application, an application programming interface (API) call from the first computer system to a web service hosted on a second cloud-based computing platform via a computer network in response to the command, to invoke an API of the web service, wherein the second cloud-based computing platform is remote from the first computer system, and wherein invocation of the API by the web service hosted on the second cloud-based computing platform initiates the test of the human-invocable operation of the cloud-based service that operates on the first cloud-based computing platform.

As noted above, in some instances the cloud-based service 103 in FIG. 1 may be a data intake and query system. A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

FIG. 3 is a block diagram illustrating an example computing environment 300 that includes a data intake and query system 310. The data intake and query system 310 obtains data from a data source 302 in the computing environment 300, and ingests the data using an indexing system 320. A search system 360 of the data intake and query system 310 enables users to navigate the indexed data. Though drawn with separate boxes, in some implementations the indexing system 320 and the search system 360 can have overlapping components. A computing device 304, running a network access application 306, can communicate with the data intake and query system 310 through a user interface system 314 of the data intake and query system 310. Using the computing device 304, a user can perform various operations with respect to the data intake and query system 310, such as administration of the data intake and query system 310, management and generation of "knowledge objects," initiating of searches, and generation of reports, among other operations. The data intake and query system 310 can further optionally include apps 312 that extend the search, analytics, and/or visualization capabilities of the data intake and query system 310.

The data intake and query system 310 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 310 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 310 can execute on a single computing device, or may be distributed over multiple computing devices. For example, the program code can include instructions for executing both indexing and search components (which may be part of the indexing system 320 and/or the search system 360, respectively), and can be executed on a computing device that also provides the data source 302. As another example, the program code can execute on one computing device, where the program code executes both indexing and search components, while another copy of the program code executes on a second computing device that provides the data source 302. As another example, the program code can execute only an indexing component or only a search component. In this example, a first instance of the program code that is executing the indexing component and a second instance of the program code that is executing the search component can be executing on the same computing device or on different computing devices.

The data source 302 of the computing environment 300 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 302 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 320 obtains machine date from the data source 302 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 320 does not require prior knowledge of the structure of incoming data (e.g., the indexing system 320 does not need to be provided with a schema describing the data). Additionally, the indexing system 320 retains a copy of the data as it was received by the indexing system 320 such that the original data is always available for searching (e.g., no data is discarded, though, in some examples, the indexing system 320 can be configured to do so).

The search system 360 searches the data stored by the indexing 320 system. As discussed in greater detail below, the search system 360 enables users associated with the computing environment 300 (and possibly also other users) to navigate the data, generate reports, and visualize results in "dashboards" output using a graphical interface. Using the facilities of the search system 360, users can obtain insights about the data, such as retrieving events from an index, calculating metrics, searching for specific conditions within a rolling time window, identifying patterns in the data, and predicting future trends, among other examples. To achieve greater efficiency, the search system 360 can apply mapreduce methods to parallelize searching of large volumes of data. Additionally, because the original data is available, the search system 360 can apply a schema to the data at search time. This allows different structures to be applied to the same data, or for the structure to be modified if or when the content of the data changes. Application of a schema at search time may be referred to herein as a late-binding schema technique.

The user interface system 314 provides mechanisms through which users associated with the computing environment 300 (and possibly others) can interact with the data intake and query system 310. These interactions can include configuration, administration, and management of the indexing system 320, initiation and/or scheduling of queries to the search system 360, receipt or reporting of search results, and/or visualization of search results. The user interface system 314 can include, for example, facilities to provide a command line interface or a web-based interface.

Users can access the user interface system 314 using a computing device 304 that communicates with data intake and query system 310, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 300. For example, a person can log in as a particular user and, using the user's digital information, can access the data intake and query system 310. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 304 can provide a human-machine interface through which a person can have a digital presence in the computing environment 300 in the form of a user. The computing device 304 is an electronic device having one or more processors and a memory capable of storing instructions for execution by the one or more processors. The computing device 304 can further include input/output (I/O) hardware and a network interface. Applications executed by the computing device 304 can include a network access application 306, which can a network interface of the client computing device 304 to communicate, over a network, with the user interface system 314 of the data intake and query system #A110. The user interface system 314 can use the network access application 306 to generate user interfaces that enable a user to interact with the data intake and query system #A110. A web browser is one example of a network access application. A shell tool can also be used as a network access application. In some examples, the data intake and query system 310 is an application executing on the computing device 306. In such examples, the network access application 306 can access the user interface system 314 without needed to go over a network.

The data intake and query system 310 can optionally include apps 312. An app of the data intake and query system 310 is a collection of configurations, knowledge objects (a user-defined entity that enriches the data in the data intake and query system 310), views, and dashboards that may provide additional functionality, different techniques for searching the data, and/or additional insights into the data. The data intake and query system 310 can execute multiple applications simultaneously. Example applications include an information technology service intelligence application, which can monitor and analyze the performance and behavior of the computing environment 300, and an enterprise security application, which can include content and searches to assist security analysts in diagnosing and acting on anomalous or malicious behavior in the computing environment 300.

Though FIG. 3 illustrates only one data source, in practical implementations, the computing environment 300 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 300, the data intake and query system 310 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud, and has digital access to resources provided by the computing devices only to the extent that such access is enabled by the provider entity.

In some implementations, the computing environment 300 can include on-prem and cloud-based computing resources, or only cloud-based resources. For example, an entity may have on-prem computing devices and a private cloud. In this example, the entity operates the data intake and query system 310 and can choose to execute the data intake and query system 310 on an on-prem computing device or in the cloud. In another example, a provider entity operates the data intake and query system 310 in a public cloud and provides the functionality of the data intake and query system 310 as a service, for example under a Software-as-a-Service (SaaS) model. In this example, the provider entity can provision a separate tenant (or possibly multiple tenants) in the public cloud network for each subscriber entity, where each tenant executes a separate and distinct instance of the data intake and query system 310. In some implementations, the entity providing the data intake and query system 310 is itself subscribing to the cloud services of a cloud service provider. As an example, a first entity provides computing resources under a public cloud service model, a second entity subscribes to the cloud services of the first provider entity and uses the cloud computing resources to operate the data intake and query system 310, and a third entity can subscribe to the services of the second provider entity in order to use the functionality of the data intake and query system 310. In this example, the data sources are associated with the third entity, users accessing the data intake and query system 310 are associated with the third entity, and the analytics and insights provided by the data intake and query system 310 are for purposes of the third entity's operations.

Figure 4:
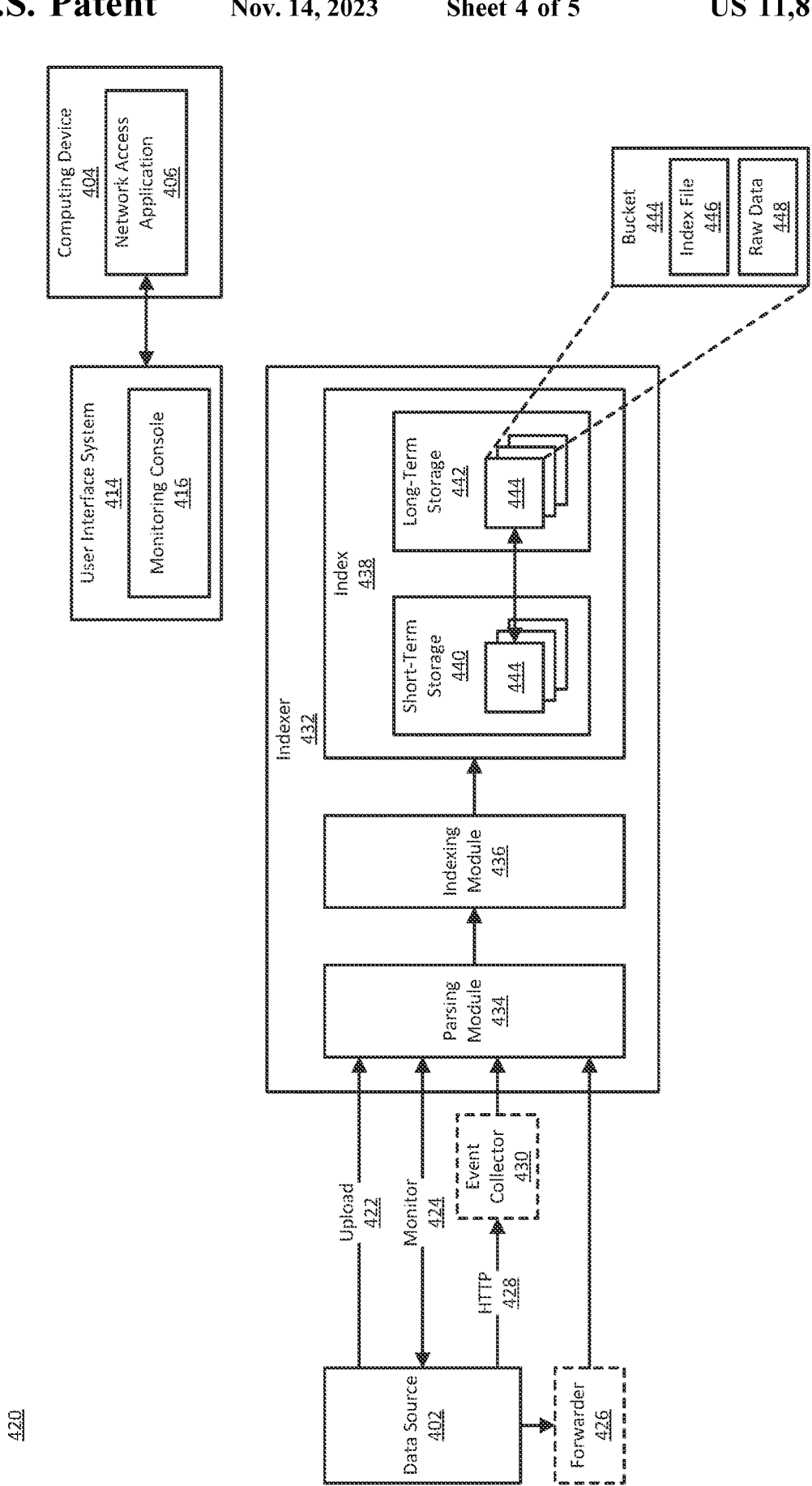
FIG. 4 is a block diagram illustrating in greater detail an example of an indexing system of a data intake and query system.

FIG. 4 is a block diagram illustrating in greater detail an example of an indexing system 420 of a data intake and query system, such as the data intake and query system 310 of FIG. 3. The indexing system 420 of FIG. 4 uses various methods to obtain machine data from a data source 402 and stores the data in an index 438 of an indexer 432. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 420 enables the data intake and query system to obtain the machine data produced by the data source 402 and to store the data for searching and retrieval.

Users can administer the operations of the indexing system 420 using a computing device 404 that can access the indexing system 420 through a user interface system 414 of the data intake and query system. For example, the computing device 404 can be executing a network access application 406, such as a web browser or a terminal, through which a user can access a monitoring console 416 provided by the user interface system 414. The monitoring console 416 can enable operations such as: identifying the data source 402 for indexing; configuring the indexer 432 to index the data from the data source 432; configuring a data ingestion method; configuring, deploying, and managing clusters of indexers; and viewing the topology and performance of a deployment of the data intake and query system, among other operations. The operations performed by the indexing system 420 may be referred to as "index time" operations, which are distinct from "search time" operations that are discussed further below.

The indexer 432, which may be referred to herein as a data indexing component, coordinates and performs most of the index time operations. The indexer 432 can be implemented using program code that can be executed on a computing device. The program code for the indexer 432 can be stored on a non-transitory computer-readable medium (e.g. a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 432. In some implementations, the indexer 432 executes on the computing device 404 through which a user can access the indexing system 420. In some implementations, the indexer 432 executes on a different computing device.

The indexer 432 may be executing on the computing device that also provides the data source 402 or may be executing on a different computing device. In implementations wherein the indexer 432 is on the same computing device as the data source 402, the data produced by the data source 402 may be referred to as "local data." In other implementations the data source 402 is a component of a first computing device and the indexer 432 executes on a second computing device that is different from the first computing device. In these implementations, the data produced by the data source 402 may be referred to as "remote data." In some implementations, the first computing device is "on-prem" and in some implementations the first computing device is "in the cloud." In some implementations, the indexer 432 executes on a computing device in the cloud and the operations of the indexer 432 are provided as a service to entities that subscribe to the services provided by the data intake and query system.

For a given data produced by the data source 402, the indexing system 420 can be configured to use one of several methods to ingest the data into the indexer 432. These methods include upload 422, monitor 424, using a forwarder 426, or using HyperText Transfer Protocol (HTTP 428) and an event collector 430. These and other methods for data ingestion may be referred to as "getting data in" (GDI) methods.

Using the upload 422 method, a user can instruct the indexing system to 402 to specify a file for uploading into the indexer 432. For example, the monitoring console 416 can include commands or an interface through which the user can specify where the file is located (e.g., on which computing device and/or in which directory of a file system) and the name of the file. Once uploading is initiated, the indexer 432 processes the file, as discussed further below. Uploading is a manual process and occurs when instigated by a user. For automated data ingestion, the other ingestion methods are used.

The monitor 424 method enables the indexing system 402 to monitor the data source 402 and continuously or periodically obtain data produced by the data source 402 for ingestion by the indexer 432. For example, using the monitoring console 416, a user can specify a file or directory for monitoring. In this example, the indexing system 402 can execute a monitoring process that detects whenever data is added to the file or directory and causes the data to be sent to the indexer 432. As another example, a user can specify a network port for monitoring. In this example, a monitoring process can capture data received at or transmitting from the network port and cause the data to be sent to the indexer 432. In various examples, monitoring can also be configured for data sources such as operating system event logs, performance data generated by an operating system, operating system registries, operating system directory services, and other data sources.

Monitoring is available when the data source 402 is local to the indexer 432 (e.g., the data source 402 is on the computing device where the indexer 432 is executing). Other data ingestion methods, including forwarding and the event collector 430, can be used for either local or remote data sources.

A forwarder 426, which may be referred to herein as a data forwarding component, is a software process that sends data from the data source 402 to the indexer 432. The forwarder 426 can be implemented using program code that can be executed on the computer device that provides the data source 402. A user launches the program code for the forwarder 426 on the computing device that provides the data source 402. The user can further configure the program code, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 426 can provide various capabilities. For example, the forwarder 426 can send the data unprocessed or can perform minimal processing on the data. Minimal processing can include, for example, adding metadata tags to the data to identify a source, source type, and/or host, among other information, dividing the data into blocks, and/or applying a timestamp to the data. In some implementations, the forwarder 426 can break the data into individual events (event generation is discussed further below) and send the events to a receiver. Other operations that the forwarder 426 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 430 provides an alternate method for obtaining data from the data source 402. The event collector 430 enables data and application events to be sent to the indexer 432 using HTTP 428. The event collector 430 can be implemented using program code that can be executing on a computing device. The program code may be a component of the data intake and query system or can be a standalone component that can be executed independently of the data intake and query system and operates in cooperation with the data intake and query system.

To use the event collector 430, a user can, for example using the monitoring console 416 or a similar interface provided by the user interface system 414, enable the event collector 430 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 402 as an alternative method to using a username and password for authentication.

To send data to the event collector 430, the data source 402 is supplied with a token and can then send HTTP 428 requests to the event collector 430. To send HTTP 428 requests, the data source 402 can be configured to use an HTTP client and/or to use logging libraries such as those supplied by Java, JavaScript, and .NET libraries. An HTTP client enables the data source 402 to send data to the event collector 430 by supplying the data, and a Uniform Resource Identifier (URI) for the event collector 430 to the HTTP client. The HTTP client then handles establishing a connection with the event collector 430, transmitting a request containing the data, closing the connection, and receiving an acknowledgment if the event collector 430 sends one. Logging libraries enable HTTP 428 requests to the event collector 430 to be generated directly by the data source. For example, an application can include or link a logging library, and through functionality provided by the logging library manage establishing a connection with the event collector 430, transmitting a request, and receiving an acknowledgement.

An HTTP 428 request to the event collector 430 can contain a token, a channel identifier, event metadata, and/or event data. The token authenticates the request with the event collector 430. The channel identifier, if available in the indexing system 420, enables the event collector 430 to segregate and keep separate data from different data sources. The event metadata can include one or more key-value pairs that describe the data source 402 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 430 extracts events from HTTP 428 requests and sends the events to the indexer 432. The event collector 430 can further be configured to send events or event data to one or more indexers. Extracting the events can include associating any metadata in a request with the event or events included in the request. In these implementations, event generation by the indexer 432 (discussed further below) is bypassed, and the indexer 432 moves the events directly to indexing. In some implementations, the event collector 430 extracts event data from a request and outputs the event data to the indexer 432, and the indexer generates events from the event data. In some implementations, the event collector 430 sends an acknowledgement message to the data source 402 to indicate that the event collector 430 has received a particular request form the data source 402, and/or to indicate to the data source 402 that events in the request have been added to an index.

The indexer 432 ingests incoming data and transforms the data into searchable knowledge in the form of events. In the data intake and query system, an event is a single piece of data that represents activity of the component represented in FIG. 4 by the data source 402. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 432 can include a parsing module 434 and an indexing module 436 for generating and storing the events. The parsing module 434 and indexing module 436 can be modular and pipelined, such that one component can be operating on a first set of data while the second component is simultaneously operating on a second sent of data. Additionally, the indexer 432 may at any time have multiple instances of the parsing module 434 and indexing module 436, with each set of instances configured to simultaneously operate on data from the same data source or from different data sources. The parsing module 434 and indexing module 436 are illustrated to facilitate discussion, with the understanding that implementations with other components are possible to achieve the same functionality.

The parsing module 434 determines information about event data, where the information can be used to identify events within the event data. For example, the parsing module 434 can associate a source type with the event data. A source type identifies the data source 402 and describes a possible data structure of event data produced by the data source 402. For example, the source type can indicate which fields to expect in events generated at the data source 402 and the keys for the values in the fields, and possibly other information such as sizes of fields, an order of the fields, a field separator, and so on. The source type of the data source 402 can be specified when the data source 402 is configured as a source of event data. Alternatively, the parsing module 434 can determine the source type from the event data, for example from an event field or using machine learning.

Other information that the parsing module 434 can determine includes timestamps. In some cases, an event includes a timestamp as a field, and the timestamp indicates a point in time when the action represented by the event occurred or was recorded by the data source 402 as event data. In these cases, the parsing module 434 may be able to determine from the source type associated with the event data that the timestamps can be extracted from the events themselves. In some cases, an event does not include a timestamp and the parsing module 434 determines a timestamp for the event, for example from a name associated with the event data from the data source 402 (e.g., a file name when the event data is in the form of a file) or a time associated with the event data (e.g., a file modification time). As another example, when the parsing module 434 is not able to determine a timestamp from the event data, the parsing module 434 may use the time at which it is indexing the event data. As another example, the parsing module 434 can use a user-configured rule to determine the timestamps to associate with events.

The parsing module 434 can further determine event boundaries. In some cases, a single line (e.g., a sequence of characters ending with a line termination) in event data represents one event while in other cases, a single line represents multiple events. In yet other cases, one event may span multiple lines within the event data. The parsing module 434 may be able to determine event boundaries from the source type associated with the event data, for example from a data structure indicated by the source type. In some implementations, a user can configure rules the parsing module 434 can use to identify event boundaries.

The parsing module 434 can further extract data from events and possibly also perform transformations on the events. For example, the parsing module 434 can extract a set of fields for each event, such as a host or hostname, source or source name, and/or source type. The parsing module 434 may extract certain fields by default or based on a user configuration. Alternatively or additionally, the parsing module 434 may add fields to events, such as a source type or a user-configured field. As another example of a transformation, the parsing module 434 can anonymize fields in events to mask sensitive information, such as social security numbers or account numbers. Anonymizing fields can include changing or replacing values of specific fields. The parsing component 434 can further perform user-configured transformations.

The parsing module 434 outputs the results of processing incoming event data to the indexing module 436, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 432 can be configured to identify searchable segments that are parts of fields, searchable segments that are entire fields, or both. The parsing module 434 organizes the searchable segments into a lexicon or dictionary for the event data, with the lexicon including each searchable segment and a reference to the location of each occurrence of the searchable segment within the event data. As discussed further below, the search system can use the lexicon, which is stored in an index file 446, to find event data that matches a search query. In some implementations, segmentation can alternatively be performed by the forwarder 426. Segmentation can also be disabled, in which case the indexer 432 will not build a lexicon for the event data. When segmentation is disabled, the search system searches the event data directly.

Building index data structures generates the index 438. The index 438 is a storage data structure on a storage device (e.g., a disk drive or other physical device for storing digital data). The storage device may be a component of the computing device on which the indexer 432 is operating (referred to herein as local storage) or may be a component of a different computing device (referred to herein as remote storage) that the indexer 438 has access to over a network. The indexer 432 can include more than one index and can include indexes of different types. For example, the indexer 432 can include event indexes, which impose minimal structure on stored data and can accommodate any type of data. As another example, the indexer 432 can include metrics indexes, which use a highly structured format to handle the higher volume and lower latency demands associated with metrics data.

The indexing module 436 organizes files in the index 438 in directories referred to as buckets. The files in a bucket 444 can include raw data files, index files, and possibly also other metadata files. As used herein, "raw data" means data as when the data was produced by the data source 402, without alteration to the format or content. As noted previously, the parsing component 434 may add fields to event data and/or perform transformations on fields in the event data, and thus a raw data file 448 can include, in addition to or instead of raw data, what is referred to herein as enriched raw data. The raw data file 448 may be compressed to reduce disk usage. An index file 446, which may also be referred to herein as a "time-series index" or tsidx file, contains metadata that the indexer 432 can use to search a corresponding raw data file 448. As noted above, the metadata in the index file 446 includes a lexicon of the event data, which associates each unique keyword in the event data in the raw data file 448 with a reference to the location of event data within the raw data file 448. The keyword data in the index file 446 may also be referred to as an inverted index. In various implementations, the data intake and query system can use index files for other purposes, such as to store data summarizations that can be used to accelerate searches.

A bucket 444 includes event data for a particular range of time. The indexing module 436 arranges buckets in the index 438 according to the age of the buckets, such that buckets for more recent ranges of time are stored in short-term storage 440 and buckets for less recent ranges of time are stored in long-term storage 442. Short-term storage 440 may be faster to access while long-term storage 442 may be slower to access. Buckets may move from short-term storage 440 to long-term storage 442 according to a configurable data retention policy, which can indicate at what point in time a bucket is old enough to be moved.

A bucket's location in short-term storage 440 or long-term storage 442 can also be indicated by the bucket's status. As an example, a bucket's status can be "hot," "warm," "cold," "frozen," or "thawed." In this example, hot bucket is one to which the indexer 432 is writing data and the bucket becomes a warm bucket when the index 432 stops writing data to it. In this example, both hot and warm buckets reside in short-term storage 440. Continuing this example, when a warm bucket is moved to long-term storage 442, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 420 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can configured (e.g., three copies of each buckets must exist within the cluster), and indexers to which buckets are copied may be selected to optimize distribution of data across the cluster.

A user can view the performance of the indexing system 420 through the monitoring console 416 provided by the user interface system 414. Using the monitoring console 416, the user can configure and monitor an index cluster, and see information such as disk usage by an index, volume usage by an indexer, index and volume size over time, data age, statistics for bucket types, and bucket settings, among other information.

Figure 5:
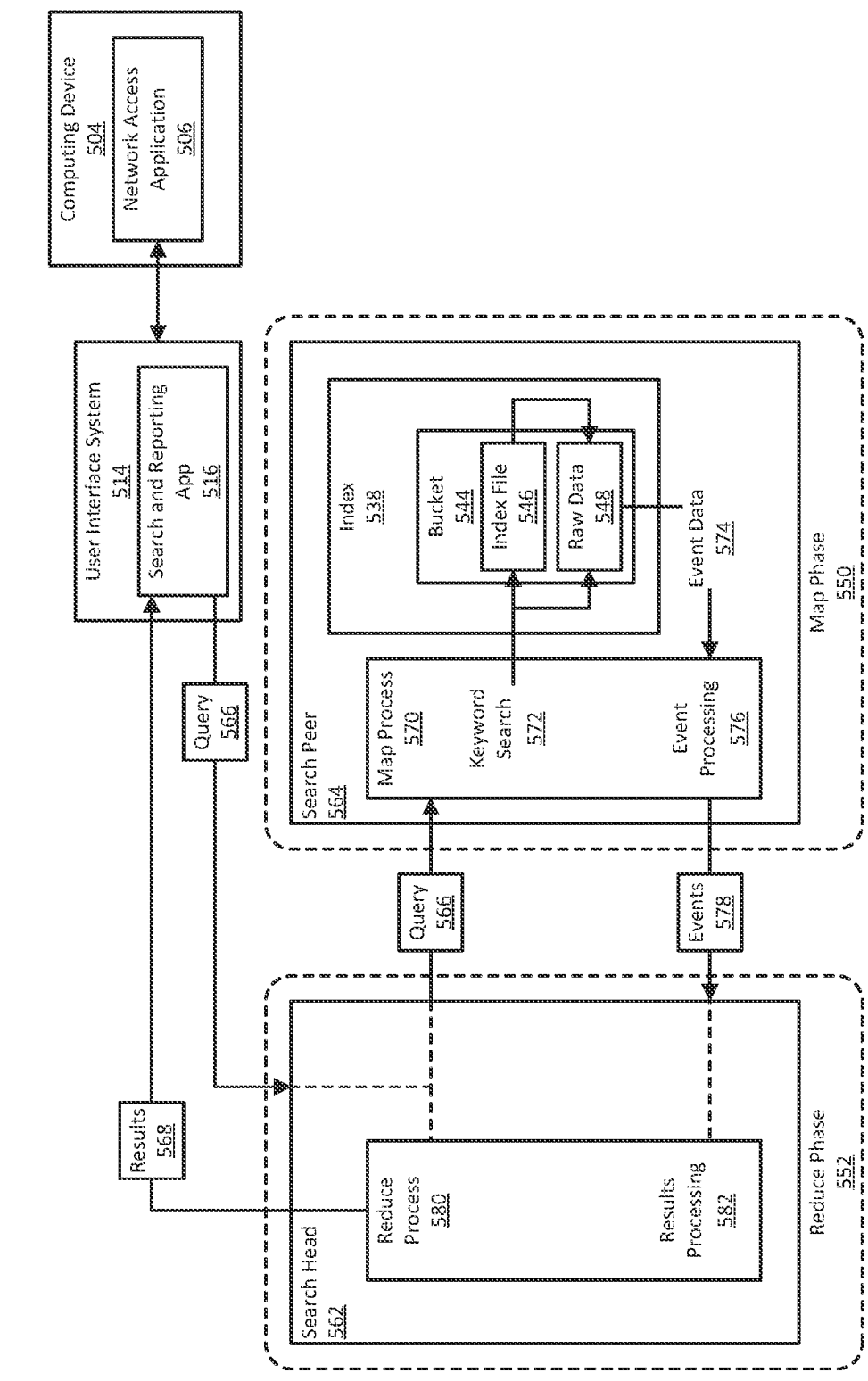
FIG. 5 is a block diagram illustrating in greater detail an example of the search system of a data intake and query system.

FIG. 5 is a block diagram illustrating in greater detail an example of the search system 560 of a data intake and query system, such as the data intake and query system 310 of FIG. 3. The search system 560 of FIG. 5 issues a query 566 to a search head 562, which sends the query 566 to a search peer 564. Using a map process 570, the search peer 564 searches the appropriate index 538 for events identified by the query 566 and sends events 578 so identified back to the search head 562. Using a reduce process 582, the search head 562 processes the events 578 and produces results 568 to respond to the query 566. The results 568 can provide useful insights about the data stored in the index 538. These insights can aid in the administration of information technology systems, in security analysis of information technology systems, and/or in analysis of the development environment provided by information technology systems.

The query 566 that initiates a search is produced by a search and reporting app 516 that is available through the user interface system 514 of the data intake and query system. Using a network access application 506 executing on a computing device 504, a user can input the query 566 into a search field provided by the search and reporting app 516. Alternatively or additionally, the search and reporting app 516 can include pre-configured queries or stored queries that can be activated by the user. In some cases, the search and reporting app 516 initiates the query 566 when the user enters the query 566. In these cases, the query 566 maybe referred to as an "ad-hoc" query. In some cases, the search and reporting app 516 initiates the query 566 based on a schedule. For example, the search and reporting app 516 can be configured to execute the query 566 once per hour, once per day, at a specific time, on a specific date, or at some other time that can be specified by a date, time, and/or frequency. These types of queries maybe referred to as scheduled queries.

The query 566 is specified using a search processing language. The search processing language includes commands that the search peer 564 will use to identify events to return in the search results 568. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 566 to include sequential commands, where a subsequent command may operate on the results of a prior command. As an example, sequential commands may be separated in the query 566 by a vertical line ("|" or "pipe") symbol.

In addition to one or more search commands, the query 566 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 566 occurs in two broad phases: a map phase 550 and a reduce phase 552. The map phase 550 takes place across one or more search peers. In the map phase 550, the search peers locate event data that matches the search terms in the search query 566 and sorts the event data into field-value pairs. When the map phase 550 is complete, the search peers send events that they have found to one or more search heads for the reduce phase 552. During the reduce phase 552, the search heads process the events through commands in the search query 566 and aggregate the events to produce the final search results 568.

A search head, such as the search head 562 illustrated in FIG. 5, is a component of the search system 560 that manages searches. The search head 562, which may also be referred to herein as a search management component, can be implemented using program code that can be executed on a computing device. The program code for the search head 562 can be stored on a non-transitory computer-readable medium and from this medium can be loaded or copied to the memory of a computing device. One or more hardware processors of the computing device can read the program code from the memory and execute the program code in order to implement the operations of the search head 562.

Upon receiving the search query 566, the search head 562 directs the query 566 to one or more search peers, such as the search peer 564 illustrated in FIG. 5. "Search peer" is an alternate name for "indexer" and a search peer may be largely similar to the indexer described previously. The search peer 564 may be referred to as a "peer node" when the search peer 564 is part of an indexer cluster. The search peer 564, which may also be referred to as a search execution component, can be implemented using program code that can be executed on a computing device. In some implementations, one set of program code implements both the search head 562 and the search peer 564 such that the search head 562 and the search peer 564 form one component. In some implementations, the search head 562 is an independent piece of code that performs searching and no indexing functionality. In these implementations, the search head 562 may be referred to as a dedicated search head.

The search head 562 may consider multiple criteria when determining whether to send the query 566 to the particular search peer 564. For example, the search system 560 may be configured to include multiple search peers that each have duplicative copies of at least some of the event data. In this example, the sending the search query 566 to more than one search peer allows the search system 560 to distribute the search workload across different hardware resources. As another example, search system 560 may include different search peers for different purposes (e.g., one has an index storing a first type of data or from a first data source while a second has an index storing a second type of data or from a second data source). In this example, the search query 566 may specify which indexes to search, and the search head 562 will send the query 566 to the search peers that have those indexes.

To identify events 578 to send back to the search head 562, the search peer 564 performs a map process 570 to obtain event data 574 from the index 538 that is maintained by the search peer 564. During a first phase of the map process 570, the search peer 564 identifies buckets that have events that are described by the time indicator in the search query 566. As noted above, a bucket contains events whose timestamps fall within a particular range of time. For each bucket 544 whose events can be described by the time indicator, during a second phase of the map process 570, the search peer 564 performs a keyword search 574 using search terms specified in the search query #A66. The search terms can be one or more of keywords, phrases, fields, Boolean expressions, and/or comparison expressions that in combination describe events being searched for. When segmentation is enabled at index time, the search peer 564 performs the keyword search 572 on the bucket's index file 546. As noted previously, the index file 546 includes a lexicon of the searchable terms in the events stored in the bucket's raw data 548 file. The keyword search 572 searches the lexicon for searchable terms that correspond to one or more of the search terms in the query 566. As also noted above, the lexicon incudes, for each searchable term, a reference to each location in the raw data 548 file where the searchable term can be found. Thus, when the keyword search identifies a searchable term in the index file 546 that matches query 566, the search peer 564 can use the location references to extract from the raw data 548 file the event data 574 for each event that include the searchable term.

In cases where segmentation was disabled at index time, the search peer 564 performs the keyword search 572 directly on the raw data 548 file. To search the raw data 548, the search peer 564 may identify searchable segments in events in a similar manner as when the data was indexed. Thus, depending on how the search peer 564 is configured, the search peer 564 may look at event fields and/or parts of event fields to determine whether an event matches the query 566. Any matching events can be added to the event data #A74 read from the raw data 548 file. The search peer 564 can further be configured to enable segmentation at search time, so that searching of the index 538 causes the search peer 564 to build a lexicon in the index file 546.

The event data 574 obtained from the raw data 548 file includes the full text of each event found by the keyword search 572. During a third phase of the map process 570, the search peer 564 performs event processing 576 on the event data 574, with the steps performed being determined by the configuration of the search peer 564 and/or commands in the search query 566. For example, the search peer 564 can be configured to perform field discovery and field extraction. Field discovery is a process by which the search peer 564 identifies and extracts key-value pairs from the events in the event data 574. The search peer 564 can, for example, be configured to automatically extract the first 100 fields (or another number of fields) in the event data 574 that can be identified as key-value pairs. As another example, the search peer 564 can extract any fields explicitly mentioned in the search query 566. The search peer 564 can, alternatively or additionally, be configured with particular field extractions to perform.

Other examples of steps that can be performed during event processing 576 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 564 sends processed events 578 to the search head 562, which performs a reduce process 580. The reduce process 580 potentially receives events from multiple search peers and performs various results processing 582 steps on the events. The results processing 582 steps can include, for example, aggregating the events from different search peers into a single set of events, deduplicating and aggregating fields discovered by different search peers, counting the number of events found, and sorting the events by timestamp (e.g., newest first or oldest first), among other examples. Results processing 582 can further include applying commands from the search query 566 to the events. The query 566 can include, for example, commands for evaluating and/or manipulating fields (e.g., to generate new fields from existing fields or parse fields that have more than one value). As another example, the query 566 can include commands for calculating statistics over the events, such as counts of the occurrences of fields, or sums, averages, ranges, and so on, of field values. As another example, the query 566 can include commands for generating statistical values for purposes of generating charts of graphs of the events.

Through results processing 582, the reduce process 580 produces the events found by processing the search query 566, as well as some information about the events, which the search head 562 outputs to the search and reporting app 516 as search results 568. The search and reporting app 516 can generate visual interfaces for viewing the search results 568. The search and reporting app 516 can, for example, output visual interfaces for the network access application 506 running on a computing device 504 to generate.

The visual interfaces can include various visualizations of the search results 568, such as tables, line or area charts, Chloropleth maps, or single values. The search and reporting app 516 can organize the visualizations into a dashboard, where the dashboard includes a panel for each visualization. A dashboard can thus include, for example, a panel listing the raw event data for the events in the search results 568, a panel listing fields extracted at index time and/or found through field discovery along with statistics for those fields, and/or a timeline chart indicating how many events occurred at specific points in time (as indicated by the timestamps associated with each event). In various implementations, the search and reporting app 516 can provide one or more default dashboards. Alternatively or additionally, the search and reporting app 516 can include functionality that enables a user to configure custom dashboards.

The search and reporting app 516 can also enable further investigation into the events in the search results 516. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 566. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

The invention claimed is:

1. A method comprising:
   executing a user-to-user messaging application in a computer system used by a human user support agent;

receiving, via a dedicated chat channel of the user-to-user messaging application, an input from the human user support agent, the input including a command for triggering a test of a human-invocable operation of a cloud-based service that operates on a first cloud-based computing platform; and transmitting, by the user-to-user messaging application, the command from the computer system to a web service hosted on a second cloud-based computing platform via a computer network, to invoke an application programming interface (API) of the web service, wherein the second cloud-based computing platform is remote from the computer system, and wherein invocation of the API by the web service hosted on the second cloud-based computing platform initiates the test of the human-invocable operation of the cloud-based service that operates on the first cloud-based computing platform.

2. The method of claim 1, wherein receiving the input from the user support agent comprises receiving the input in the dedicated chat channel that is dedicated for use in triggering test operations on the cloud-based service that operates on the first cloud-based computing platform.

3. The method of claim 1, wherein receiving the input from the user support agent comprises receiving the input in the dedicated chat channel that is dedicated for use in triggering the test of the human-invocable operation on the cloud-based service that operates on the first cloud-based computing platform.

4. The method of claim 1, wherein the user-to-user messaging application is an Internet relay chat (IRC) based chat application.

5. The method of claim 1, wherein receiving the input from the user support agent comprises receiving the input in the dedicated chat channel, wherein the dedicated chat channel is dedicated for use in triggering test operations on the cloud-based service that operates on the first cloud-based computing platform, and wherein the user-to-user messaging application is an Internet relay chat (IRC) based chat application.

6. The method of claim 1, wherein receiving the input from the user support agent comprises receiving the input in the dedicated chat channel that is dedicated for use in triggering the test of the human-invocable operation on the cloud-based service that operates on the first cloud-based computing platform, and wherein the user-to-user messaging application is an Internet relay chat (IRC) based chat application.

7. The method of claim 1, wherein the web service hosted on the second cloud-based computing platform is an event-driven, serverless, cloud-based computing service.

8. The method of claim 1, wherein the web service hosted on the second cloud-based computing platform is an event-driven, serverless, cloud-based computing service, and the user-to-user messaging application is an Internet relay chat (IRC) based chat application.

9. The method of claim 1, wherein the web service hosted on the second cloud-based computing platform is an event-driven, serverless, cloud-based computing service, the user-to-user messaging application is an Internet relay chat (IRC) based chat application, wherein receiving the input from the user support agent comprises receiving the input in the dedicated chat channel, and wherein the dedicated chat channel is dedicated for use in triggering test operations on the cloud-based service that operates on the first cloud-based computing platform.

10. The method of claim 1, wherein the human-invocable operation of the cloud-based service that operates on the first cloud-based computing platform is a user login operation.

11. The method of claim 1, wherein the human-invocable operation of the cloud-based service that operates on the first cloud-based computing platform is a search query.

12. The method of claim 1, wherein the command specifies a parameter to be used in executing the human-invocable operation of the cloud-based service that operates on the first cloud-based computing platform.

13. The method of claim 1, wherein the command specifies a parameter to be used in executing the human-invocable operation of the cloud-based service that operates on the first cloud-based computing platform, and wherein the parameter comprises at least one of a user credential or a search query criterion.

14. The method of claim 1, wherein the cloud-based service that operates on the first cloud-based computing platform is a service of a data intake and query system.

15. The method of claim 1, wherein:
the cloud-based service that operates on the first cloud-based computing platform is part of a data intake and query system;
the web service hosted on the second cloud-based computing platform is an event-driven, serverless, cloud-based computing service;
receiving the input including the command from the user support agent comprises receiving the input in the dedicated chat channel of an Internet relay chat (IRC) based chat based application, wherein the dedicated chat channel is dedicated for use in triggering the test of the human-invocable operation on the cloud-based service that operates on the first cloud-based computing platform; and
the command specifies a parameter to be used in executing the human-invocable operation of the cloud-based service that operates on the first cloud-based computing platform.

16. A non-transitory computer-readable medium having instructions stored thereon, execution of which by a processor in a processing system cause performance of operations comprising:
executing a user-to-user messaging application in a computer system used by a user support agent;
receiving, via a dedicated chat channel of the user-to-user messaging application, an input from the user support agent, the input including a command for triggering a test of a human-invocable operation of a cloud-based service that operates on a first cloud-based computing platform; and
transmitting, by the user-to-user messaging application, the command from the computer system to a web service hosted on a second cloud-based computing platform via a computer network, to invoke an application programming interface (API) of the web service, wherein the second cloud-based computing platform is remote from the computer system, and wherein invocation of the API by the web service hosted on the second cloud-based computing platform initiates the test of the human-invocable operation of the cloud-based service that operates on the first cloud-based computing platform.

17. The non-transitory computer-readable medium of claim 16, wherein receiving the input from the user support agent comprises receiving the input in the dedicated chat channel, wherein the dedicated chat channel is dedicated for use in triggering the test of the human-invocable operation on the cloud-based service that operates on the first cloud-based computing platform.

18. The non-transitory computer-readable medium of claim 16, wherein the web service hosted on the second cloud-based computing platform is an event-driven, serverless, cloud-based computing service.

19. A computer system comprising:
a processor; and
a non-transitory computer-readable medium having stored thereon instructions, execution of which by the processor, cause the computer system to perform operations including:
executing a user-to-user messaging application in the computer system used by a user support agent;
receiving, via a dedicated chat channel of the user-to-user messaging application, an input from the user support agent, the input including a command for triggering a test of a human-invocable operation of a cloud-based service that operates on a first cloud-based computing platform; and transmitting, by the user-to-user messaging application, the command from the computer system to a web service hosted on a second cloud-based computing platform via a computer network, to invoke an application programming interface (API) of the web service, wherein the second cloud-based computing platform is remote from the computer system, and wherein invocation of the API by the web service hosted on the second cloud-based computing platform initiates the test of the human-invocable operation of the cloud-based service that operates on the first cloud-based computing platform.

20. The non-transitory computer-readable medium of claim 16, wherein receiving the input from the user support agent comprises receiving the input in the dedicated chat channel, wherein the dedicated chat channel is dedicated for use in triggering the test of the human-invocable operation on the cloud-based service that operates on the first cloud-based computing platform, and wherein the web service hosted on the second cloud-based computing platform is an event-driven, serverless, cloud-based computing service.

\* \* \* \* \*